US009130762B2

(12) United States Patent
Tan et al.

(10) Patent No.: US 9,130,762 B2
(45) Date of Patent: *Sep. 8, 2015

(54) NETWORK-OPTIMIZED CONTENT DELIVERY FOR HIGH DEMAND NON-LIVE CONTENTS

(71) Applicant: AT&T INTELLECTUAL PROPERTY I, L.P., Atlanta, GA (US)

(72) Inventors: Elysia C. Tan, New York, NY (US); Han Nguyen, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,027

(22) Filed: Oct. 16, 2014

(65) Prior Publication Data

US 2015/0032808 A1    Jan. 29, 2015

Related U.S. Application Data

(63) Continuation of application No. 14/249,952, filed on Apr. 10, 2014, now Pat. No. 8,886,754, which is a continuation of application No. 13/754,443, filed on Jan. 30, 2013, now Pat. No. 8,738,743, which is a continuation of application No. 11/965,456, filed on Dec. 27, 2007, now Pat. No. 8,386,629.

(51) Int. Cl.
*G06F 15/16* (2006.01)
*H04L 12/18* (2006.01)
(Continued)

(52) U.S. Cl.
CPC .......... *H04L 12/18* (2013.01); *H04L 12/1836* (2013.01); *H04L 12/1868* (2013.01);
(Continued)

(58) Field of Classification Search
CPC .......... H04L 65/4069–65/4079; H04L 12/185; H04L 12/1881
USPC .................. 370/312; 709/217–219, 231–235
See application file for complete search history.

(56) References Cited

U.S. PATENT DOCUMENTS 6,269,080 B1    7/2001 Kumar
6,351,467 B1    2/2002 Dillon
(Continued)

OTHER PUBLICATIONS

Vlavianos, et al., "BiTos: Enhancing BitTorrent for Supporting Streaming Applications," INFOCOM 2006. 25th IEEE International Conference on Computer Communications. Proceedings, pp. 1-6 Apr. 23-29, 2006 doi: 10.1109/INFOCOM.2006.43.
(Continued)

*Primary Examiner* — Emmanuel L Moise
*Assistant Examiner* — Julian Chang
(74) *Attorney, Agent, or Firm* — Hoffmann & Baron, LLP

(57) ABSTRACT

A method, apparatus and computer-readable storage medium distribute a non-live content stream in a network. An initial meta-file is transmitted in response to a request for the content, which identifies a division of the content stream into blocks, and available sources for delivery of the blocks. The initial meta-file can identify a first multicast and a second multicast server, assigning a first and second portion of the blocks for delivery using the first and second multicast source server, respectively. The first and second portions are transmitted using the first and second multicast source servers, respectively. The first and second portions correspond to distinct non-overlapping portions of the non-live content stream. The initial meta-file can also identify a unicast source server, assigning a third portion of the blocks for delivery using the unicast source server, the third potion being transmitted by the unicast source server.

20 Claims, 5 Drawing Sheets

(51) Int. Cl.
*H04L 29/06* (2006.01)
*H04L 29/08* (2006.01)
*H04L 12/70* (2013.01)

(52) U.S. Cl.
CPC ............ *H04L65/4076* (2013.01); *H04L 65/60* (2013.01); *H04L 67/06* (2013.01); *H04L 67/10* (2013.01); *H04L 67/42* (2013.01); *H04L 12/1881* (2013.01); *H04L 65/4069* (2013.01); *H04L 2012/5642* (2013.01)

(56) References Cited

U.S. PATENT DOCUMENTS

| | | |
|---|---|---|
| 6,501,763 B1 | 12/2002 | Bhagavath et al. |
| 6,574,795 B1 | 6/2003 | Carr |
| 6,981,032 B2 | 12/2005 | Boivie et al. |
| 7,012,891 B1 | 3/2006 | Chandran et al. |
| 7,143,179 B2 | 11/2006 | Yaport et al. |
| 7,260,601 B1 | 8/2007 | Day et al. |
| 7,260,716 B1 | 8/2007 | Srivastava |
| 7,443,791 B2 | 10/2008 | Barrett et al. |
| 7,472,197 B2 | 12/2008 | Li et al. |
| 7,516,232 B2 | 4/2009 | Barrett et al. |
| 7,545,812 B2 | 6/2009 | Barrett et al. |
| 7,590,889 B1 | 9/2009 | Maxemchuk et al. |
| 7,614,071 B2 | 11/2009 | Barrett et al. |
| 7,908,389 B2 | 3/2011 | Zuckerman et al. |
| 8,019,885 B2 | 9/2011 | Yu et al. |
| 8,169,916 B1 | 5/2012 | Pai et al. |
| 8,654,684 B1 | 2/2014 | Pai et al. |
| 2002/0065929 A1 | 5/2002 | Kamentsky et al. |
| 2003/0023738 A1 | 1/2003 | Boivie et al. |
| 2003/0037331 A1 | 2/2003 | Lee |
| 2003/0051250 A1 | 3/2003 | Sugimoto et al. |
| 2003/0204602 A1 | 10/2003 | Hudson et al. |
| 2003/0206549 A1 | 11/2003 | Mody et al. |
| 2004/0073596 A1 | 4/2004 | Kloninger et al. |
| 2005/0078680 A1 | 4/2005 | Barrett et al. |
| 2005/0081243 A1 | 4/2005 | Barrett et al. |
| 2005/0081246 A1 | 4/2005 | Barrett et al. |
| 2006/0028995 A1 | 2/2006 | Canoy et al. |
| 2006/0190615 A1 | 8/2006 | Panwar et al. |
| 2006/0206606 A1 | 9/2006 | Iloglu et al. |
| 2007/0101012 A1 | 5/2007 | Li et al. |
| 2007/0133484 A1 | 6/2007 | Albal et al. |
| 2007/0263626 A1 | 11/2007 | Warden |
| 2007/0288638 A1 | 12/2007 | Vuong et al. |
| 2008/0077701 A1 | 3/2008 | Kongalath et al. |
| 2008/0140853 A1 | 6/2008 | Harrison |
| 2008/0141321 A1 | 6/2008 | Kubat et al. |
| 2008/0141328 A1 | 6/2008 | Weintraub et al. |
| 2008/0160911 A1 | 7/2008 | Chou et al. |
| 2008/0189702 A1 | 8/2008 | Morgan et al. |
| 2009/0024754 A1 | 1/2009 | Setton et al. |
| 2009/0055471 A1 | 2/2009 | Kozat et al. |
| 2009/0059832 A1 | 3/2009 | Jhamnani et al. |
| 2009/0063681 A1 | 3/2009 | Ramakrishnan et al. |
| 2009/0083806 A1 | 3/2009 | Barrett et al. |
| 2009/0098822 A1 | 4/2009 | Dugoujon et al. |
| 2009/0116481 A1 | 5/2009 | Ishii |
| 2009/0164655 A1 | 6/2009 | Pettersson et al. |
| 2009/0165062 A1 | 6/2009 | Harris et al. |
| 2009/0182815 A1 | 7/2009 | Czechowski, III et al. |
| 2009/0183211 A1 | 7/2009 | Yan et al. |
| 2009/0185522 A1 | 7/2009 | Periyalwar et al. |
| 2009/0199250 A1 | 8/2009 | Assouline et al. |
| 2009/0248872 A1 | 10/2009 | Luzzatti et al. |
| 2009/0265746 A1 | 10/2009 | Halen et al. |
| 2010/0011103 A1 | 1/2010 | Luzzatti et al. |
| 2010/0106851 A1 | 4/2010 | Aoki et al. |
| 2010/0191825 A1 | 7/2010 | Yamagishi et al. |

OTHER PUBLICATIONS

Souza, et al. DynaPeer: A Dynamic Peer-to-Peer Based Delivery Scheme for VoD Systems. Euro-Par 2007 Parallel Processing Lecture Notes in Computer Science, 2007, vol. 4641/2007, 769-781.

Guo, et al., P2Cast: Peer-To-Peer Patching Scheme for VoD Service. 2003 International World Wide Web Conference archive Proceedings of the 12th International Conference on World Wide Web, pp. 301-309.

Dana, et al., "BASS: BitTorrent Assisted Streaming System for Video-on-Demand," Multimedia Signal Processing, 2005 IEEE 7th Workshop on, vol., No., pp. 1-4, Oct. 30, 2005-Nov. 2, 2005.

Peltotalo, et al., A Massively Scalable Persistent Content Distribution System. Proceedings of the Sixth IASTED International Conference on Communications, Internet, and Information Technology. 2007.

Griwodz, et al., Multicast for Savings in Cache-Based Video Distribution. 2000 Multimedia Communications and Networks.

Agrawal, MTorrent: A Multicast Enabled BitTorrent Protocol. ITT Kanpur 2008.

Silva, Bitocast: A Hybrid BitTorrent and IP Multicast Content Distribution Solution. FCT-UNL 2009.

Choe, et al., Improving VoD server efficiency with bittorrent. International Multimedia Conference: Proceedings of the 15th International Conference on Multimedia; Sep. 25-29, 2007.

NETWORK-OPTIMIZED CONTENT DELIVERY FOR HIGH DEMAND NON-LIVE CONTENTS

CROSS-REFERENCE TO RELATED APPLICATIONS

This application is a continuation of, and claims priority to, U.S. application Ser. No. 14/249,952, filed Apr. 10, 2014; which claims priority to U.S. application Ser. No. 13/754,443, filed Jan. 30, 2013, now issued as U.S. Pat. No. 8,738,743, which claims priority to U.S. application Ser. No. 11/965,456, filed Dec. 27, 2007, now issued as U.S. Pat. No. 8,386,629, which are incorporated herein by reference in their entirety.

FIELD

The disclosed embodiments generally relates to the field of data transmission systems for digital communications and more particularly to the optimization and/or management of the distribution of non-live content using Internet Protocol (IP) multicast data transmissions combined with unicast and/or other parallel transmission means over a network.

BACKGROUND

Traditional internet distribution of non-live content generally employs a unicast delivery system. Also, when unicast is used, it is generally the exclusive method of transmitting content. Unicast communications send one copy of each data packet to each intended recipient. However, unicast presents scaling problems, when the group of recipients is large. In unicast, the network must carry one copy of the same content data for each destination client, thus requiring additional bandwidth for data transmission. Thus, the server and network resources required are directly proportional to the number of receiving clients.

Non-live content, as referred to herein, is generally a download defined by a fixed length text, video, audio and/or data file. The entire content is preferably recorded and/or defined prior to initiating delivery. Examples of such content files include one or more software applications, movies, videos, music, news, periodicals, journals, magazines or electronic documents. Thus, non-live content can include non-time critical downloads, such as a new software release. The start time, end time or download speed for delivery of such non-time critical content is not necessarily significant to the end user. Also, non-live content can include more time critical downloads, such as a popular new movie release, which must be displayed to the end user in near real-time shortly after the download is initiated. However, both of these examples are distinguished from live content, whose entirety is not well defined at the start of delivery. A defining characteristic of non-live content delivery is the lack of synchronicity, in terms of both time and download bandwidth, amongst receiving clients.

IP multicasting (also referred to as simply "multicasting" or "multicast") provides a useful way for a source to transmit a stream of content data to a group of recipients. Multicasting transmits only one copy of the data packets from the content source server and allows multicast enabled routers to do the work required to optimally replicate and deliver that packet to each intended recipient Like unicast, when multicast is used, it is generally the exclusive method of transmitting content. Multicast uses the concept of a group to route its data. A group of receivers subscribe to a particular multicast transmission. The individual receivers of the group need not physically or geographically be located near one another. Similarly, the data can be transmitted to the group from one or more sources located virtually anywhere, as long as they can communicate with the receivers through a common network of computers, such as the Internet.

Rather than transmitting multiple copies of data packets, with one copy going to each receiver's IP address as in unicast, multicast transmits one copy of its data packets to a designated multicast group address. Each source in a multicast session transmits data which is assigned to that source's IP address and the designated multicast group's IP address. This address pair is generally represented by the notation (S, G), where S is a source IP address and G is the group IP address.

Traditionally, no two sources would transmit to the same multicast group having the same (S, G) IP address pairing. However, for reliability, two or more sources can be assigned an identical IP address S transmitting the same content to the same group address G. This type of source addressing is referred to as an Anycast source address. With an Anycast source address each multicast-enabled router in the network can select and join the multicast tree of the nearest available source, which will result in two (or more) disjoint multicast trees when multiple Anycast the sources are in operation. When one of the Anycast sources fails, an automatic rerouting mechanism of the multicast-enabled routers previously on the tree of the failed source will select and join the tree of the nearest remaining source(s). Further information on multicasting is provided in U.S. Pat. No. 6,501,763, which is incorporated herein by reference.

While multicast is very resource efficient, it is historically considered unsuited for delivery of non-live or non-simultaneous content due to the lack of synchronicity amongst the receiving clients and that a uniform delivery stream bandwidth (BW) cannot be assured. Delivering non-live content through multicast is further disfavored due to problems associated with data loss. Data loss has a potentially more significant impact in multicast than in unicast transmissions. The distribution of routers in a multicast session generally has a tree-like configuration with numerous branches. Thus, this multicast configuration means that when packets are lost in transit, all recipients on downstream branches from that point lose the same packet(s). Such data loss has various sources, such as congestion or irrecoverable errors in the network.

In order to improve network and server resource efficiencies when using unicast, methods such as local network server caching and peer-to-peer (P2P) redistribution techniques have been used. Local caching uses multiple local servers to receive a content stream from the origin servers and deliver the content to individual receivers closest to them. While reducing the distribution burden to some network resources, local caching does not reduce the burden on content servers and their network-access links. While current P2P delivery can reduce the burden on the CP's content servers and access links, it is not network-optimized; it can actually worsen the burden on the long haul network by substituting long-haul network efficient delivery by local cache servers with inefficient delivery by distant P2P sources. P2P takes advantage of the computing power of individual user computers. Any user participating in a P2P-based delivery acts as a content host by downloading the content from the Content Provider (CP) server(s). In this way, each participating P2P host becomes a server for other receivers that are in the process of downloading or will in the future download the content. However, while being more server efficient, P2P burdens tend to increase network transmission distance and therefore network resource usage, thus further reducing network efficiency. Also, in the case where P2P hosts are connected via the internet, since many individual internet users have very limited upstream bandwidth, P2P becomes less viable as CP's start increasing BW requirements for particular content streams.

Additionally, during the course of content delivery, there is generally a great deal of uncertainty and unpredictability regarding the level of demand for any particular content. High/low demand periods can fluctuate and the popularity of particular content can increase and decrease dramatically. This makes capacity planning difficult for a CP who generally pre-plans their network-access and server capacities, in order to ensure an adequate supply of servers and network access link resources devoted to each content stream. Once a distribution plan for content is decided, a CP does not typically change it during a delivery period, even though content demand in that period may be very different from what was predicted.

SUMMARY

One embodiment relates to a method of distributing a non-live content stream in a network. The method comprises transmitting an initial meta-file in response to receiving a request for a non-live content stream. The initial meta-file comprises information, and the information identifies a division of the content stream. The information also identifies a multicast source server and a unicast source server. The method also comprises transmitting at least a first portion of the non-live content stream using the multicast source server and at least a second portion of the non-live content stream using the unicast source server.

Another embodiment relates to a computer-readable medium comprising instructions, wherein execution of the instructions by at least one computing device distributes a non-live content stream in a network. The non-live content stream is thereby distributed by transmitting an initial meta-file in response to receiving a request for a non-live content stream. Also, the initial meta-file comprises information, and the information identifies a division of the content stream, a multicast source server and a unicast source server. The non-live content stream is further distributed by transmitting at least a first portion of the non-live content stream using the multicast source server and at least a second portion of the non-live content stream using the unicast source server.

Yet another embodiment relates to a system for distributing a non-live content stream in a network. The system comprises a multicast source server adapted to transmit at least a first portion of the non-live content stream in response to transmission of an initial meta-file. The initial meta-file is transmitted in response to receiving a request for a non-live content stream. Also, the initial meta-file comprises information, where the information identifies a division of the content stream and a unicast source server adapted to transmit at least a second portion of the non-live content stream. Further, the initial meta-file identifies the multicast source server and the unicast source server.

Yet a further embodiment relates to a method of distributing a non-live content stream in a network, where the method includes dividing the non-live content stream into a plurality of blocks. The method also includes generating an initial meta-file associated with the blocks, where the meta-file for each of the blocks includes information associated with at least two content stream sources. Also, the sources include a multicast server and a non-multicast server. Further, the method includes transmitting the plurality of blocks and the meta-file data in the network.

Additionally, the information above can represent the division of the content stream into a plurality of blocks, where the first and second portions comprise distinct blocks. The meta-file can comprise data identifying at least one of a plurality of blocks, a sequence number associated with each of the plurality of blocks, a size of the plurality of blocks, a checksum of the plurality of blocks and at least one source address. Further, the method, system and/or execution of instructions from the computer readable medium described above can further receive information representing a quantity of destinations to which the content stream is transmitted. Also, the method, system and/or execution of instructions from the computer readable medium described above can transmit a subsequent meta-file. The subsequent meta-file can comprise information identifying a source server different from at least one of the multicast source server and the unicast source server. Also, the subsequent meta-file can be transmitted subsequent to transmission of at least one of the first and second portions of non-live content stream.

The disclosed embodiments also relate to a method of distributing a non-live content stream in a network, which includes transmitting an initial meta-file in response to receiving a request for a non-live content stream, the initial meta-file identifying a division of the content stream into a plurality of blocks, and a plurality of available sources for delivery of the plurality of blocks. The plurality of available sources include a first multicast source server and a second multicast source server, the initial meta-file assigning a first portion of the plurality of blocks for delivery using the first multicast source server, and assigning a second portion of the plurality of blocks for delivery using the second multicast source server. The method further includes transmitting the first portion of the plurality of blocks using the first multicast source server, and transmitting the second portion of the plurality of blocks using the second multicast source server. The first and second portions correspond to distinct non-overlapping portions of the non-live content stream.

The disclosed embodiments also relate to a non-transitory computer-readable storage medium storing computer-readable instructions that, when executed by a computing device, causes the computing device to distribute a non-live content stream in a network by transmitting an initial meta-file in response to receiving a request for a non-live content stream. The initial meta-file identifies a division of the non-live content stream into a plurality of blocks, and a plurality of available sources for delivery of the plurality of blocks. The plurality of available sources include a first multicast source server and a second multicast source server, the initial meta-file assigning a first portion of the plurality of blocks for delivery using the first multicast source server, and assigning a second portion of the plurality of blocks for delivery using the second multicast source server. The instructions further cause the computing device to transmit the first portion of the plurality of blocks using the first multicast source server, and the second portion of the plurality of blocks using the second multicast source server. The first and second portions correspond to distinct non-overlapping portions of the non-live content stream.

The disclosed embodiments additionally relate to an apparatus for distributing a non-live content stream in a network, which includes a meta-file server device, a first multicast server device and a second multicast server device. The meta-file server device transmits an initial meta-file, the initial meta-file being transmitted in response to receiving a request for a non-live content stream, the initial meta-file identifying a division of the non-live content stream into a plurality of blocks, and a plurality of available sources for delivery of the plurality of blocks. The available sources include the first multicast source server device and the second multicast source server device. The first multicast source server device transmits a first portion of the plurality of blocks in response to transmission of the initial meta-file, the initial meta-file assigning the first portion of the plurality of blocks for delivery using the first multicast source server device. The second multicast source server device transmits a second portion of the plurality of blocks, the initial meta-file assigning the second portion of the plurality of blocks for delivery using the second multicast source server device. The first and second portions correspond to distinct non-overlapping portions of the non-live content stream.

Other aspects of the disclosed embodiments will become apparent from the following detailed description considered in conjunction with the accompanying drawings. It is to be understood, however, that the drawings are designed as an illustration only and not as a definition of the limits of the disclosed embodiments.

DETAILED DESCRIPTION

The disclosed embodiments relate to a method and system that enables online distribution of a non-live content stream using IP multicast. The embodiments preferably use multicast to deliver the bulk of the content, while using an additional content delivery method for any portions needed to complete the content delivery. The additional content delivery method(s) can include unicast, anycast, local caching and/or network-optimized peer-to-peer networking. The embodiments also include a method whereby the lack of synchronicity from traditional multicast is overcome by using hybrid delivery methodologies, allowing non-live content delivery to benefit from the efficiencies in network, content server and access link resources derived from multicast delivery. This method and system can deliver content to clients requiring varied download bandwidths, and start and completion times by using parallel servers preferably using more than one delivery technique.

The method and system of the disclosed embodiments are preferably suited for on-line delivery of large-size, high demand non-live content. The embodiments can reduce costs, increase efficiency in a network, including a CP's servers and local access link resources. Additionally, the method and system presented herein is less limited by local bandwidth restrictions/uniformity or lack of synchronicity. Also, it can reduce capacity planning uncertainty and/or make the accuracy of such planning less critical.

There is, therefore, a need for a method of and system for delivering non-live content that reduces costs, is more efficient for the network, including the CP's servers, local access link resources, and less limited by local bandwidth restrictions or lack of synchronicity. Also, a distribution method and system is needed that reduces capacity planning uncertainty, minimizes the need to do such planning and/or makes the accuracy of such planning less critical.

Figure 1:
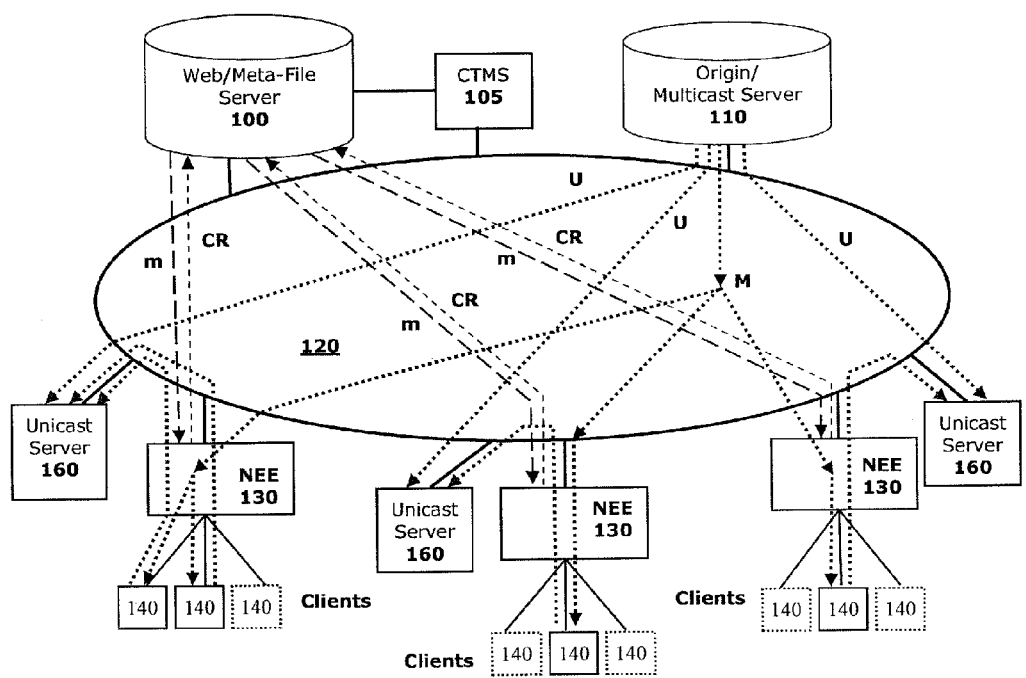
FIG. 1 is a schematic representation of a network configuration for content delivery.

As shown in FIG. 1, the CP preferably uses a Web/Meta-File Server 100 to interact with clients 140 requesting content. Preferably, the Web/Meta-File Server 100 acts as a traditional web server, providing information and receiving information from the clients 140. The term "clients" is intended to mean any entity (individual or group) capable of requesting and receiving the subject content. Thus, a client 140 seeking to obtain a content-object file transmits a Content Request CR, which is in turn received by the Web/Meta-File Server 100. Thereafter, the Web/Meta-File Server 100 can, if appropriate, transmit a content meta-file m or have one transmitted to the client 140. The content meta-file m will then provide the client 140 with the necessary information to obtain the content. It should be understood that while the Web/Meta-File Server 100 is shown as a single piece of equipment, it can be a collection of servers working together to perform the necessary tasks.

In one embodiment, a Content Transport Management Server (CTMS) 105 generates the provided meta-file and controls the contents therein (i.e., the information provided to the clients 140). The Web Server 100 can communicate with the CTMS 105 as needed. Additionally, the CTMS 105 can analyze content demand and manage the network servers and/or resources delivering the content. Alternatively, those functions and capabilities described for the CTMS 105 can be provided by more than one server or can be incorporated in part or in whole into the Web/Meta-File Server 100.

In order to ensure content delivery, the CP will preferably have available at least one Origin/Multicast Server 110, which stores and maintains the non-live content to be delivered and additional related information. The Origin/Multicast Server 110 is responsible for distribution of the entire content-object file. The content-object file is transmitted to clients 140 through the network 120 preferably using a hybrid multicast delivery method. The hybrid multicast delivery method in accordance with the disclosed embodiments preferably uses one or more multicast M, supplemented or enhanced by one or more parallel or concurrent unicast(s) U.

Using the provided meta-file m, the client 140 preferably joins one or more available multicast(s) M as needed to obtain the bulk of the requested content. It should be understood that while only a single multicast M session is illustrated; preferably more than one such session is available to each client 140. Thus, the client can receive one or more simultaneous content streams using this method. Also, the client 140 may leave any individual source once it is no longer needed.

The Origin/Multicast Server 110 preferably delivers content through each multicast M to one or more Network Edge Equipment (NEE) 130, which each provides a substantially direct link to one or more clients 140. FIG. 1 shows inactive clients 140, indicated by boxes with phantom lines, as well as active clients 140, indicated by boxes with solid lines. As shown, one or more active and/or inactive clients 140 can be connected to a particular NEE 130. It should be noted that although this description makes use of DSL broadband access service network environment to illustrate the application of the disclosed embodiments, these embodiments are applicable for any wired or wireless access network-service environment that supports multicast transport (either in native or tunneled mode). The NEE 130 routes data between the clients 140 and the network 120. Hence, the NEE in this description preferably represents any IP transport network-service (wired or wireless) access equipment that is multicast-capable. However, it should be understood that multicast tunneling or other configurations could be employed; in order to support a particular NEE that is not multicast-capable.

Additionally, the Origin/Multicast Server 110 preferably delivers content or portions thereof through unicast U or multicast M to several designated and preferably local Unicast Servers 160. While the illustration in FIG. 1 shows the Unicast Server 160 receiving its content stream through unicast, it should be understood that it can receive its content stream through either unicast or multicast. Each Unicast Server 160 is preferably selected by the CP for optimization, and can be located in close proximity to active clients 140, or a more remote, perhaps central, location. Preferably, the Unicast Server 160 is a local cache server. Alternatively, the Origin/Multicast Server 100 can even act as a designated Unicast Server 160. A function of the Unicast Server 160 is to maintain an entire single copy of the content file and make any portion thereof available for a client to download on request from clients. It should be understood that although only a single unicast server 160 is illustrated supplying the client 140 with the necessary portion(s) of the unicast U, more than one such unicast servers server can be made available to each client 140 in the form of multiple Unicast servers or Anycast servers, and potentially in combination with using other downloading clients operating in P2P mode as sources.

The Unicast Servers 160 act as a unicast source for the clients 140 and can direct to the clients 140, through the NEE 130, any portion of the content that was lost, received in error or otherwise needed. Without access to a Unicast Server 160, if a client 140 joined a multicast M after the start of a content transmission, they would either have to wait for a replay of the content transmission to catch the beginning or simply miss the beginning. Accordingly, the Unicast Servers 160 can be used to download those missing initial portions. Thus, the Unicast Servers 160 make fast start-up or start-of-play available, without making the client wait for the replay or do without the beginning of the content. Also, immediate access to start-of-play or initial portions allows delivery of time-critical or chronologically arranged content using the hybrid multicast of the disclosed embodiments.

In an alternative embodiment, the CP may intentionally exclude selected, critical portions or blocks of data from the multicast streams, making these blocks available only through the unicast servers. This will render the content received from the multicast streams unusable unless it is supplemented by the excluded blocks. The need for each recipient to obtain these blocks directly from the Unicast Server 160 gives the CP an avenue to control access to the content stream for various purposes, e.g. to control access to subscriber only content, to enforce digital rights, etc. In this way, the Unicast Servers 160 can be designated as the sole sources for selected portions of the content that are only made available via unicast, for content access-control purpose. For example, a CP might select some portions of the content object to be embedded with target user-specific watermarks and/or encrypted with a target user/device specific key and delivered to target user/device via one or more Unicast Servers 160. Thus, the Unicast Servers 160 can be used to obtain rich service extensibility and flexibility.

While the network 120 is shown as a unified collection of communication devices, presumably controlled or accessible by a single CP, it should be understood that the network 120 and its resources are not necessarily provided or controlled by a single entity. The network 120 can be formed by multiple concatenated networks. Additionally, although this embodiment is discussed in the context of contemporary internet communication, it can apply equally to intranet, private or other networks.

Figure 2:
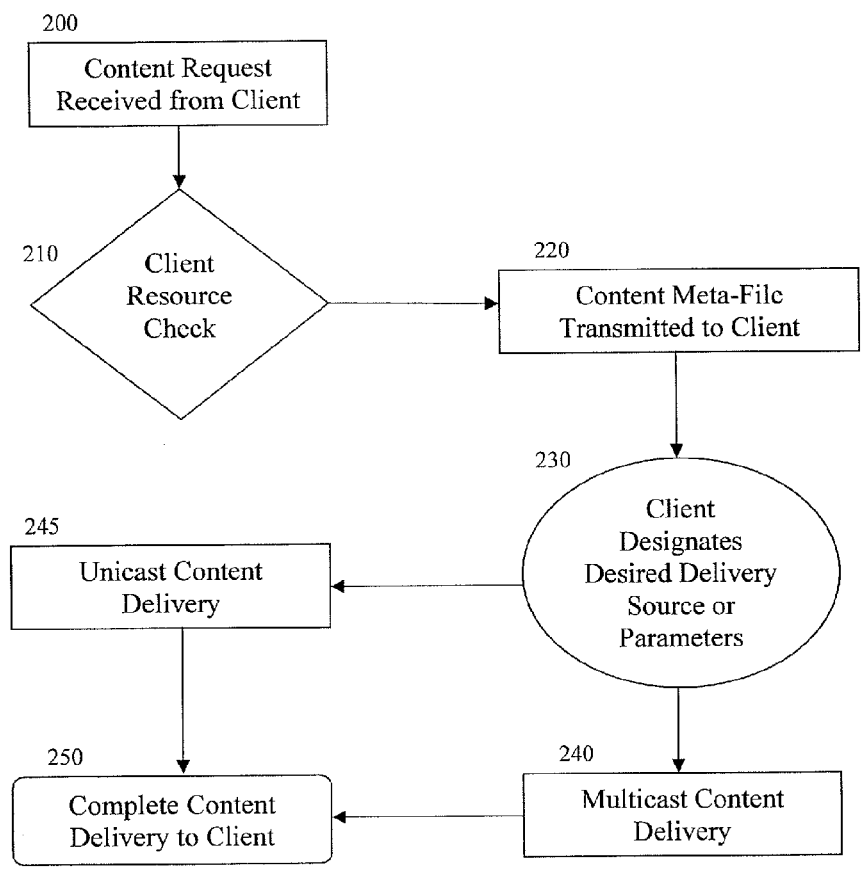
FIG. 2 is a flow chart showing a method for delivering high-demand non-live content in accordance with one embodiment.

While the CP can plan, configure and reconfigure the appropriate network resources to ensure delivery of the content, it is the end users or clients that individually or as a group request it. Thus as mentioned above, it is the individual clients that initiate a request for a particular non-live content. As shown in the flowchart of FIG. 2, a request for content is preferably received in 200 by the CP from a client via the network, as described above.

Then in 210, the CP preferably verifies and/or checks what resources the client has in order to ensure they can successfully receive the desired content. For example, do they require software in order to download and/or run the requested file; are they capable of receiving multicast; or other resource inquiries. As mentioned above, the interaction between the CP and the client can be performed by a web server, meta-file server, CTMS and/or other facility, through a query or interaction with the client. Alternatively, a client's ability to receive multicast can be determined through a multicast-reception test. In this way a client is instructed to fetch information from an always-on multicast channel that continuously transmits a small deterministically varied information object (such as a Universal Time Clock reading). If a particular client cannot successfully report the information object, that client will not be considered multicast capable.

The CP in 220 preferably transmits or directs delivery of a content meta-file to the client. The content meta-file preferably contains information, such as a description about the content-object and a list of available sources for delivery of the content. The meta-file is preferably transmitted/delivered in 220 via unicast prior to and separately from the content. If a client is deemed multicast capable, then preferably the provided meta-file would contain one or more multicast addresses and at least one Unicast Server address. If there is more than one multicast source, the client can choose to join one source at a time or any number of sources simultaneously. The designated source or sources are preferably selected as a function of desired completion time and available download bandwidth.

In one embodiment, the client is sent the same meta-file regardless of whether they are multicast capable or not. In the event they are not multicast capable, they can attempt to join the multicast and resort to using the unicast source after timing-out with the multicast source. Alternatively, if the client is not deemed able to receive multicast up front, then a different meta-file is chosen that contains only one or more unicast servers as the available source(s). Thus, the client would use the meta-file to obtain necessary source information, even though they could not benefit from a hybrid multicast delivery. Alternatively, the client could be provided with a different type of file or other data indicating that the desired content must be obtained through unicast only. As a further alternative, the non-multicast capable client's request could "time-out" after a period of not receiving a response from the CP, indicating they must use unicast. As yet a further alternative, if a client is determined to be non-multicast capable, they can be provided with software to enable multicast capabilities.

Once received, the meta-file is preferably used by the client in 230 to choose or designate desired delivery source(s) or parameters. At this point, or perhaps prior to delivering the meta-file, the CP can provide the client or direct them to obtain any necessary software, such as a downloader file. If a multicast source is listed in the meta-file, the client can begin multicast content delivery in 240, while also using the unicast content delivery in 245. Alternatively, if no multicast source is listed or if the client is simply not able to use multicast, then the unicast content delivery in 245 would be exclusively used.

In 240 multicast delivery can be implemented by the client joining one or more available multicast sessions. Preferably, the client can disconnect from any source at any time it is no longer needed or desirable. Additionally, the client preferably uses the unicast content delivery in 245 to obtain missing or otherwise needed content blocks. In this way, the client can obtain a significant portion of the content-object file from the multicast source(s) in 240 and obtain any blocks with errors, missing blocks or otherwise needed blocks from the unicast source in 245. Additionally, the unicast source in 245 can be used to obtain needed start of file blocks to speed up or catch-up to the segments being delivered by the selected multicast source(s) in 240. In 250, the complete content is delivered to the client.

It should be noted that both unicast and multicast sources may additionally use Anycast for network optimality, redundancy and/or load balancing. Anycast is a network addressing and routing method in which multiple servers are assigned the same identical IP address (referred to as an Anycast address) and communication traffic from clients directed at that Anycast address are routed by the network to the nearest available server from source network. Both unicast and multicast delivery may utilize Anycast technology so as to optimize the match between a source server and a recipient of the content in terms of delivery of the content from server to receiver. Anycast can be used in conjunction with multicast transport to provide source redundancy, in conjunction with unicast transport to provide server redundancy and load-sharing. In the case of Anycast with unicast transport, by providing the network with near real-time information on utilization of each unicast server (via the CTMS) the network can apply routing control technique to direct the client communication traffic to the nearest server that is not highly loaded rather than just the nearest server in operation. Such routing techniques are disclosed in as described in U.S. Published Patent Application No. 2006/0206606 to Iloglu et al., which is incorporated herein by reference.

Alternatively, in addition to or in place of the unicast source, network optimized P2P networking can be used to obtain needed blocks from peer computers that already have that portion of the content. One criterion for P2P network optimality is locality. In other words, other clients that have already retrieved or are retrieving the same content-object file and are in the same local network zone as a given client (referred to as localized peers) can act as a source by supplementing or working in place of the Unicast server unicast source. For example, with reference to FIG. 1, the two active clients 140 in the lower left portion could work as localized peers, with one retrieving needed data from the other. The network provider may choose other criterion for determining which P2P sources are best matches for particular receivers.

Figure 3:
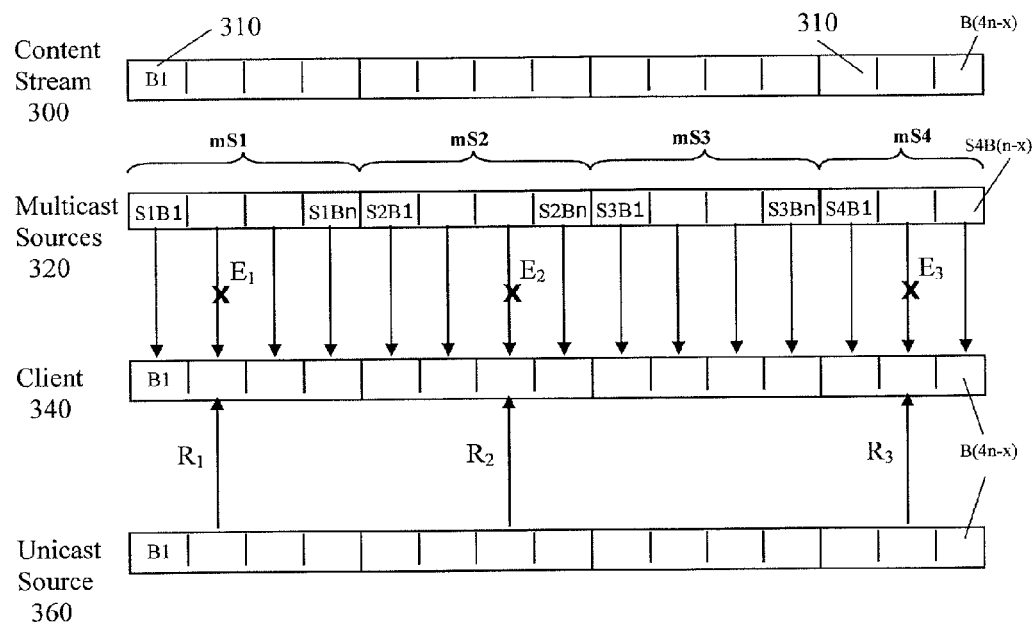
FIG. 3 illustrates distribution of data corresponding to content delivery in accordance with one embodiment.

FIG. 3 shows one embodiment where the content-object file is transmitted over the network as a content stream 300 for delivery to the client 340. The entire stream 300 is divided into blocks 310. The actual size of each block or each sequence of blocks is preferably decided by the CP. Generally, a balance is met between using too many blocks (a small block size), which demands greater overhead, versus too few blocks (a large block size), which translates into wasted resources when a large block contains an error. However, the CP can choose any block size appropriate to the content being delivered and the environment in which it is being delivered.

FIG. 3 shows four multicast sources 320 (individually designated as mS1, mS2, mS3 and mS4) are delivering non-overlapping ranges or segments of blocks 310. It should be understood, however, that a single multicast source can be used or alternatively a greater number of multicast sources can be used. However, when multiple parallel sources are used as shown in FIG. 3, it allows each receiving client to determine its own download rate by choosing to receive from one or more of the sources either simultaneously or sequentially. In FIG. 3, the first three sources mS1, mS2, mS3 deliver a number of blocks 310 equal to the variable n. In this illustration, the variable "n" equals 4; however the actual number of blocks will depend on the length of the content file. The last source mS4 is shown delivering "n-x" blocks 310, which represents the remaining blocks 310 needed to complete the content stream 300. As shown in FIG. 3, the variable "x" equals 1, however once again the actual number will depend on the content file. Thus, the total number of blocks 310 included in the illustrated content stream 300 is calculated by "4n-x"; where the "4" represents the number of sources 320; the "n" represents the number of blocks being delivered by each multicast source mS1, mS2, mS3, except the last mS4; and the "x" represents the difference between the number of blocks in the earlier segments and the number of blocks in the last segment, delivered by multicast source mS4. Preferably, using a hybrid multicast delivery method that employs both multicast and unicast, all the blocks B1 through B(4n-x) contained in the content stream 300 get delivered to each client 340.

FIG. 3 also shows that the content-object file or content stream 300 is divided into indexed blocks 310, which can be optionally grouped into segments of contiguous blocks (B1-Bn). Preferably, substantially all the blocks 310 are divided into the same size. However, at least one block in the stream 300 may be smaller, containing any remaining data which does not fill an entire block, unless padding bits are used for the last block to fill it out to the size of the other blocks.

The meta-file generated for the content-object file, preferably contains a content-object descriptor (COD) and a list of sources able to provide or transmit the content. The COD preferably contains the overall content-object file ID, size, checksum, total number of blocks and their individual checksums. Optionally, the file type, access control information and other information that is relevant to either the CP or the client are also included.

The source list in the meta-file preferably identifies each source or group of sources available for downloading the content. The source list preferably includes for each source an address, assigned range of blocks, sequence number for the blocks, the length of the blocks and other control information the CP determined is needed for the download. Preferably the sources include one or more multicast sources and at least one unicast source. The CP can decide how many sources and whether or when a multicast, unicast, anycast or any other particular source is included in the source list, based on the projected and/or current demand for the content. The embodiments described below explain some alternatives for how the file data is distributed and delivered from the various sources. However, it is the source list that indicates to the client what current distribution scheme is available. The client can be supplied with software that includes instructions to periodically check for and download the latest meta-file and switch sources to the latest ones available. This gives the CP more control to dynamically switch currently downloading clients to other sources allowing the CP tremendous flexibility to manage the content delivery sources based on current demand.

The CP can preferably collect real-time or periodic receiver statistics per content stream that can be used to decide when the number of interested receivers exceeds or falls below their threshold. Such statistics can be reported periodically by the clients, the NEE or other network resources. Alternatively, the CP can assume current demand follows the number of Content Requests, ignoring or estimating clients that drop-out of a session. Also, if network optimized P2P delivery is utilized, the above statistics can be used to keep current the list of available network optimized P2P sources for each group of receivers. As a further alternative, the CP can monitor actual demand for a particular content based on information provided by a network provider.

Regardless of how the CP collects and analyzes its statistics, preferably it can dynamically determine how many, and what types of servers (unicast or multicast) are needed to be maintained, dropped or brought online to adequately serve the current demand. These changes can be reflected in the source lists in the content meta-file downloaded to new or currently downloading receivers. The CP can thus react dynamically to the demand for that content. The CP preferably has the ability to change the delivery source selections at any time during a delivery period. This is preferably done by changing the source list information contained in the meta-file. In this way, in response to a significant change in demand for a particular content-object file the CP can change distribution methods mid-stream. The decision to implement hybrid multicast is preferably driven by the actual or likely density of active download clients 140 within a particular timeframe. Also, if a content stream 300 exceeds or drops below a CP's download demand threshold, this too can drive the decision of whether to continue to use, stop using or switch over to hybrid multicast. If it is determined that demand for a particular content is not high enough to use hybrid multicast, the CP can switch over to a different distribution method, such as unicast only. Also, if content is currently being delivered exclusively by unicast and the demand gets high enough, the CP should be able to switch over to hybrid multicast. The higher the number of active clients 140, the more beneficial hybrid multicast can benefit the CP. Also, other factors such as required download completion time, throughput requirements for the delivery or whether the download content is time critical or not can influence a CP's decision of which delivery technique to use.

A change in network resources supplying content can impact downloading clients. Clients initiating Content Requests after a dynamic meta-file change would simply use the updated source list to obtain the content from the active sources. However, clients already downloading when a source server is dropped, will be forced to switch to another source or rely entirely on the sources (multicast and/or unicast) listed in the original meta-file they received. Alternatively, the client can request an updated meta-file. It is the CP's decision whether such source server drops are appropriate for the delivery of a particular content stream. For some content streams it may be more appropriate to let each server complete serving its current receivers before being brought offline for that stream.

One embodiment demonstrating how to distribute the multicast portion of the delivery is shown in FIG. 3. In particular, a group of four (4) designated sources 320 are each responsible for continuous, repeated replay of distinct, non-overlapping portions or segments of the content, in conjunction with a unicast source 360 responsible for supplying any needed blocks or portions from a complete copy of the content 300. Using this distribution method, high bandwidth clients desiring fast download can join two or more of the multicast sources for the bulk of the content file and use the unicast source to obtain needed blocks. This particular distribution method is preferably suited for non-time critical downloads, such as the download of a new software release or other applications that do not need any part of the content for display or use until the entire content is successfully downloaded. The duration of the download is primarily a function of the length of the content and the speed of the user link available to support the download. FIG. 3 shows the client 340 receiving the content from various sources, particularly four multicast sources 320 and a unicast source 360. However, several downloaded blocks S1B2, S2B3, S4B2 are missing or contain errors $E_1$, $E_2$, $E_3$. The client 340 is then able to obtain the missing or replacement data $R_1$, $R_2$, $R_3$ from the unicast source 360. Thus, each client 340 compiles a complete data-content file based on blocks received from more than one source.

Figure 4:
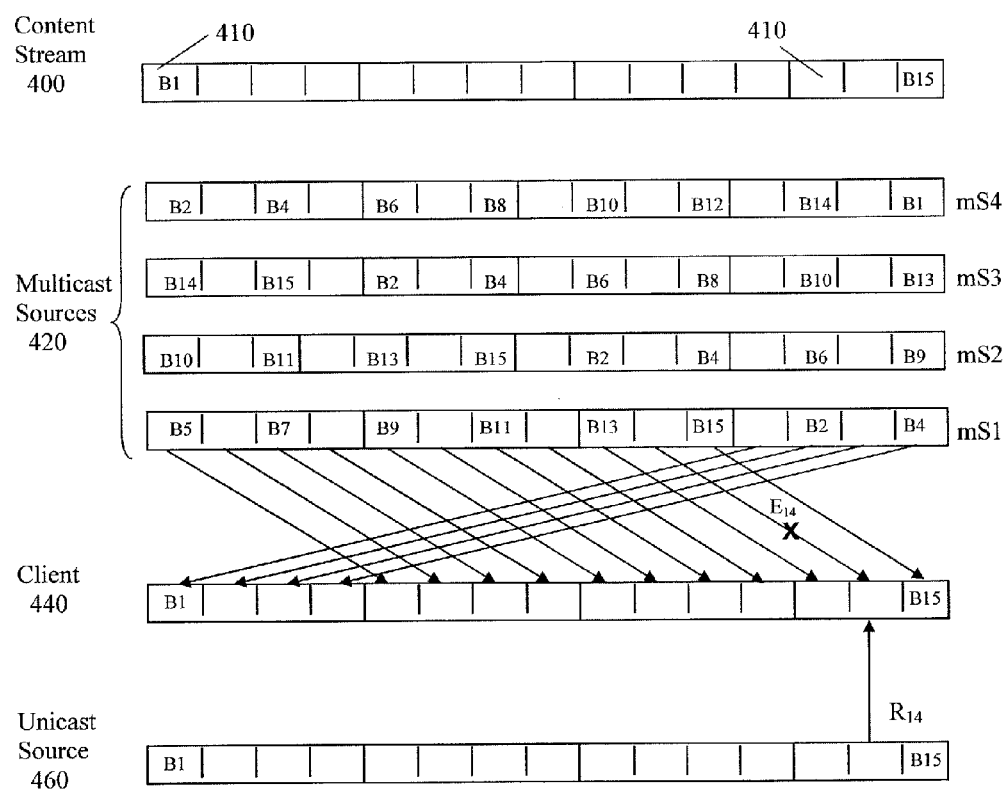
FIG. 4 illustrates distribution of data corresponding to content delivery in accordance with another embodiment.

FIG. 4 shows another embodiment demonstrating an alternative method of distributing the multicast portion of the content. The CP establishes a group of multicast sources 420 mS1, mS2, mS3, mS4 that are each responsible for contiguous, repeated replay of the entire content stream 400 out-of-phase with each other. This multicast distribution is done in conjunction with a unicast source 460 responsible for supplying any needed blocks or portions. The client 440 can join one of the multicast source(s) for the bulk of the content file and use the unicast source to obtain missing blocks and/or blocks with errors. For non-time critical downloads almost any available multicast source can be chosen for downloading the bulk of the content. FIG. 4 shows the client 440 joining a multicast mS1 to download most of the blocks 410, while obtaining a replacement block $R_{14}$ from the unicast source 460. In this example, mS1 was chosen but due to the timing of when the client 440 joined the session, the client first receives block B5, rather than the first block B1. However, with a non-time critical download, the client can wait for multicast mS1 to replay and receive blocks B1-B4 at the end.

The choice or selection of which multicast source to use can be left to client preferences. If the download is not time critical and the content is not needed until it has been downloaded in its entirety, then the selection of which source to use can be random. However, if the client desires to start using (e.g. displaying a movie) the content as soon as possible, before the content has been downloaded in its entirety, then the below embodiment can be implemented.

In the case of multiple overlapping out-of-phase multicast sources, a client can join more than one source for faster download completion (at the expense of more download bandwidth consumption). If it chooses to subscribe to only one source (due to limited download bandwidth) it may "hunt" for the source which is currently transmitting closest to the beginning of the file if the client wishes to minimize content object play-out delay (e.g., in the case of audio or video file).

Figure 5:
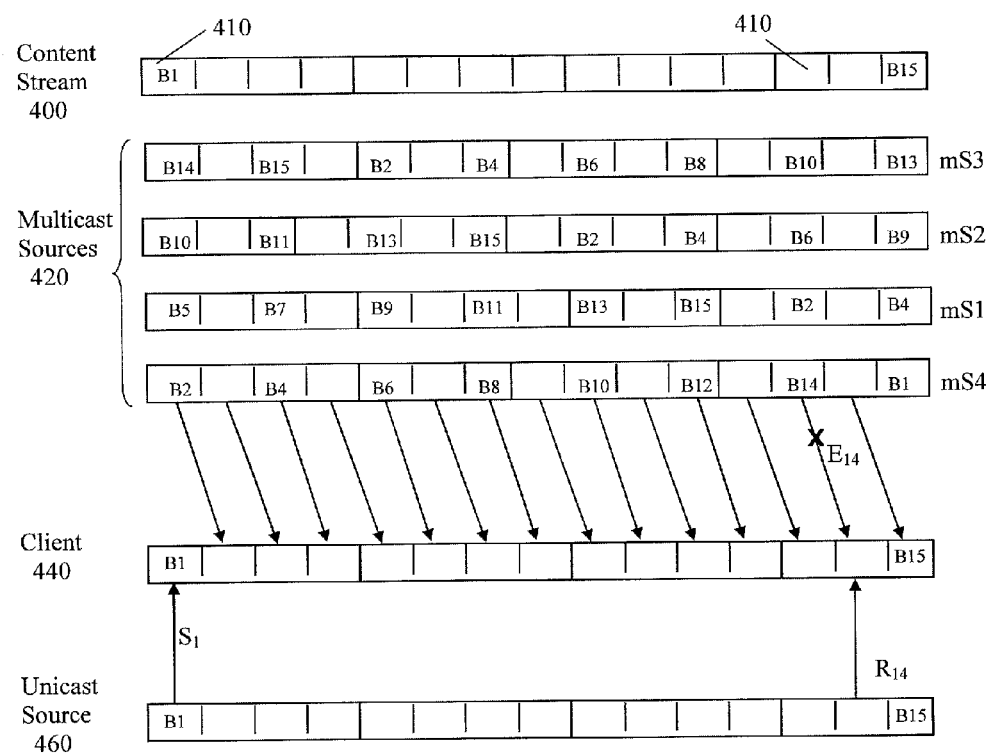
FIG. 5 illustrates distribution of data corresponding to content delivery in accordance with yet another embodiment.

FIG. 5 shows yet a further embodiment similar to that shown in FIG. 4. The embodiment in FIG. 5, as with FIG. 4, uses four multicast sources 420, each transmitting the entire content file, but time-shifted from one another. In this embodiment, the client 440 initially joins all of the multicast sources 420 in order to identify the source that is currently delivering content blocks closest to the start of the content file. The client 440 then chose to continue to download from multicast source mS4 and drop the other multicast sources mS1, mS2, mS3. The client simultaneously joined one or more unicast sources 460 to obtain the missing blocks or blocks with errors $R_{14}$, as well as the missing start block B1. Once sufficient missing blocks have been received (particularly any missing start blocks) the client can start playing the content, while continuing to receive the remaining content file from its various sources. Thus, the bulk of the content file is downloaded from the chosen multicast source mS4. The client 440 also uses the unicast source 460 to fill-in any missing blocks. This particular distribution method is preferably suited for downloads that the client desires to play as soon as possible, before the entire content file download has been completed. For example, the download of a popular movie, television show or video, newly available on-line. In such instances, the start of the file must be available almost immediately at the start of the download and there should not be any interruption in playing the file once it starts.

As shown, by using four multicast sources, each multicast source mS1, mS2, mS3, mS4 is time shifted by approximately a quarter of the length of the content file from the others. Thus, on average a client should be able to start a download from a single multicast server, recovering less than a quarter of the content file from an alternate source. It should be understood that a greater or smaller number of sources can be provided, if warranted by content demand. The greater the number of sources, the greater the likelihood that a client can join a source at or near the start of a replay cycle.

Distribution in accordance with the disclosed embodiments can be performed over almost any network. Such networks include wired or wireless traditional or future telecommunications networks, data networks, corporate networks, the Internet, personal or private area networks or other means available to communicate information. The networks can be a single network or a concatenation of networks amongst two or more providers and private and public networks, and each of the network or components of the network may be either wired or wireless. Additionally, the method and system of the disclosed embodiments can use various forms of multicast techniques and/or protocols. In a preferred embodiment, Source Specific Multicast (SSM) is used since the source(s) of the multicast content is/are deterministic and known ahead of time. An SSM multicast channel (S, G) is dynamically assigned to a particular content stream (live) or content-object (non-live) that needs to be delivered. If source redundancy is needed for higher reliability, the Anycast sourcing technique as described above can be used. Choice of specific multicast technique and/or protocol is up to the network provider based on their own considerations.

Although preferred embodiments have been described herein with reference to the accompanying drawings, it is to be understood that these embodiments are not limited to those precise embodiments and that various other changes and modifications may be effected herein by one skilled in the art without departing from the scope or spirit of these embodiments, and that it is intended to claim all such changes and modifications that fall within the scope of these embodiments.

What is claimed is:

1. A method of distributing non-live content, the method comprising:
    transmitting, using a meta-file server, an initial meta-file in response to receiving a request for non-live content, the initial meta-file identifying a division of the non-live content into blocks, the initial meta-file identifying available sources for delivery of the blocks, the available sources including a first multicast source server and a second multicast source server, the initial meta-file assigning a first portion of the blocks to be delivered using the first multicast source server, the initial meta-file assigning a second portion of the blocks to be delivered using the second multicast source server;
    transmitting, using the first multicast source server, the first portion of the blocks; and
    transmitting, using the second multicast source server, the second portion of the blocks, the first and second portions corresponding to distinct non-overlapping portions of the non-live content.

2. The method as defined by claim 1, wherein the available sources further comprise a unicast source server, the initial meta-file assigning a third portion of the blocks to be delivered using the unicast source server, the method further comprising transmitting the third portion of the blocks using the unicast source server, the third portion corresponding to an additional distinct non-overlapping portion of the non-live content.

3. The method as defined by claim 1, wherein the initial meta-file comprises data identifying the blocks, a sequence number associated with each of the blocks, a size of the blocks, a checksum of the blocks, and a source address.

4. The method as defined by claim 1, further comprising receiving information representing a quantity of destinations to which the non-live content is transmitted.

5. The method as defined by claim 1, further comprising transmitting an updated meta-file subsequent to transmission of the initial meta-file, the updated meta-file identifying a source server different from the first multicast source server and the second multicast source server.

6. The method as defined by claim 5, wherein the updated meta-file is transmitted subsequent to transmission of the first portion and the second portion of the non-live content stream.

7. The method as defined by claim 5, wherein the source server different from the first multicast source server and the second multicast source server is a unicast source server.

8. A computer-readable storage device storing instructions that, when executed by a server, causes the server to distribute non-live content by performing operations comprising:
    transmitting an initial meta-file in response to receiving a request for non-live content, the initial meta-file identifying a division of the non-live content into blocks, the initial meta-file identifying available sources for delivery of blocks, the available sources including a first multicast source server and a second multicast source server, the initial meta-file assigning a first portion of the blocks for delivery using the first multicast source server, the initial meta-file assigning a second portion of the blocks for delivery using the second multicast source server;
    transmitting the first portion of the blocks using the first multicast source server; and
    transmitting the second portion of the blocks using the second multicast source server, the first and second portions corresponding to distinct non-overlapping portions of the non-live content.

9. The computer-readable storage device of claim 8, wherein the available sources further comprise a unicast source server, the initial meta-file assigning a third portion of the blocks to be delivered using the unicast source server, the operations further comprising transmitting the third portion of the blocks using the unicast source server, the third portion corresponding to an additional distinct non-overlapping portion of the non-live content.

10. The computer-readable storage device of claim 8, wherein the initial meta-file comprises data identifying the blocks, a sequence number associated with each of the blocks, a size of the blocks, and a checksum of the blocks.

11. The computer-readable storage device of claim 8, wherein the operations further comprise enabling the computing device to receive information representing a quantity of destinations to which the non-live content is transmitted.

12. The computer-readable storage device of claim 8, wherein the operations further comprise transmitting an updated meta-file subsequent to transmission of the initial meta-file, the updated meta-file identifying a source server different from the first multicast source server and the second multicast source server.

13. The computer-readable storage device of claim 12, wherein the updated meta-file is transmitted subsequent to transmission of the first portion and second portions of the non-live content.

14. The computer-readable storage device of claim 12, wherein the source server different from the first multicast source server and the second multicast source server is a unicast source server.

15. An apparatus that distributes non-live content in a network, the apparatus comprising:
  a meta-file server transmitting an initial meta-file, the initial meta-file being transmitted in response to receiving a request for non-live content, the initial meta-file identifying a division of the non-live content into blocks, the initial meta-file identifying available sources for delivery of the plurality of blocks;
  a first multicast source server transmitting a first portion of the blocks in response to transmission of the initial meta-file, the initial meta-file assigning the first portion of the blocks to be delivered using the first multicast source server device; and
  a second multicast source server transmitting a second portion of the blocks, the initial meta-file assigning the second portion of the blocks to be delivered using the second multicast source server device, the available sources including the first multicast source server device and the second multicast source server device, the first and second portions corresponding to distinct non-overlapping portions of the non-live content.

16. The apparatus as defined by claim 15, further comprising a unicast source server transmitting a third portion of the blocks, the initial meta-file assigning the third portion of the blocks to be delivered using the unicast source server, the available sources including the unicast source server, the third portion corresponding to an additional distinct non-overlapping portion of the non-live content.

17. The apparatus as defined by claim 15, wherein the meta-file server receives information representing a quantity of destinations to which the non-live content is transmitted.

18. The apparatus as defined by claim 15, wherein the meta-file server transmits an updated meta-file subsequent to the transmission of the initial meta-file.

19. The apparatus as defined by claim 18, wherein the updated meta-file identifies a source server different from the first multicast source server and the second multicast source server.

20. The apparatus as defined by claim 19, wherein the source server different from the first multicast source server and the second multicast source is a unicast source server.

* * * * *